J. M. MILLER.
MEANS FOR VAPORIZING LIQUID FUEL.
APPLICATION FILED JULY 3, 1917.

1,310,245.

Patented July 15, 1919.

Inventor
James M. Miller

Gould & Gould.
Attorney.

UNITED STATES PATENT OFFICE.

JAMES M. MILLER, OF WASHINGTON, DISTRICT OF COLUMBIA.

MEANS FOR VAPORIZING LIQUID FUEL.

1,310,245.  Specification of Letters Patent.  Patented July 15, 1919.

Application filed July 3, 1917. Serial No. 178,469.

*To all whom it may concern:*

Be it known that I, JAMES M. MILLER, a citizen of the United States, residing at Washington, District of Columbia, have invented certain new and useful Improvements in Means for Vaporizing Liquid Fuel, of which the following is a specification.

This invention relates to an improved method of and means for vaporizing liquid fuel for gas engines, whereby to subject the fuel to the direct heat effect of the exhaust gases, to convert said fuel into a thermal vapor prior to the admission of air to provide the necessary mixture.

It has been heretofore proposed to heat the fuel by the exhaust gases, but ordinarily this has been accomplished by heating the air prior to its mixture with the fuel, which method results in a spray condition of the fuel in the inlet manifold. It is important, particularly with the low grade of fuel material in use, that the spray condition be eliminated, and that as near a thermal vapor as possible be produced from the fuel. Furthermore it is of importance that this change in the condition of the fuel should occur prior to the mixture of the air therewith, as the mixture of the air and a thermal vapor is more readily and intimately secured, than the mixture of the air with a spray condition of the fuel.

The main object of the present invention therefore, is the provision of means whereby the fuel, through the heat from the exhaust gases, is converted into a thermal vapor, prior to the admission of air for mixture-forming purposes.

In carrying out this object, the inlet manifold and Venturi tube are arranged wholly within the exhaust manifold, while the fuel chamber is arranged at one side of the exhaust manifold and connected to the Venturi tube by a conduit, or vaporizing tube, which between the fuel chamber and Venturi tube extends through the exhaust manifold. The fuel in its passage through this conduit is subjected to the direct action of the heat of the exhaust gases, with the effect to convert the fuel passing through the conduit into a thermal vapor, which is delivered as such through the valve-controlled end of the conduit in the Venturi tube, and at this point mixed with air to provide the desired mixture.

The invention further contemplates the provision of means whereby auxiliary fuel, or gas of any appropriate character, may be introduced into the said conduit, adjacent its entrant end, a manually-operable valve controlling both the ordinary and auxiliary fuels, to permit their use in mixed proportions, or either alone, at the will of the driver. This provides for the use of kerosene, or the like. The disadvantages incident to the use of these fuels at present is entirely overcome in the present invention by the method herein disclosed of converting such fuels into thermal vapor.

The invention in the preferred form is shown in the accompanying drawings, in which.

Figure 1:
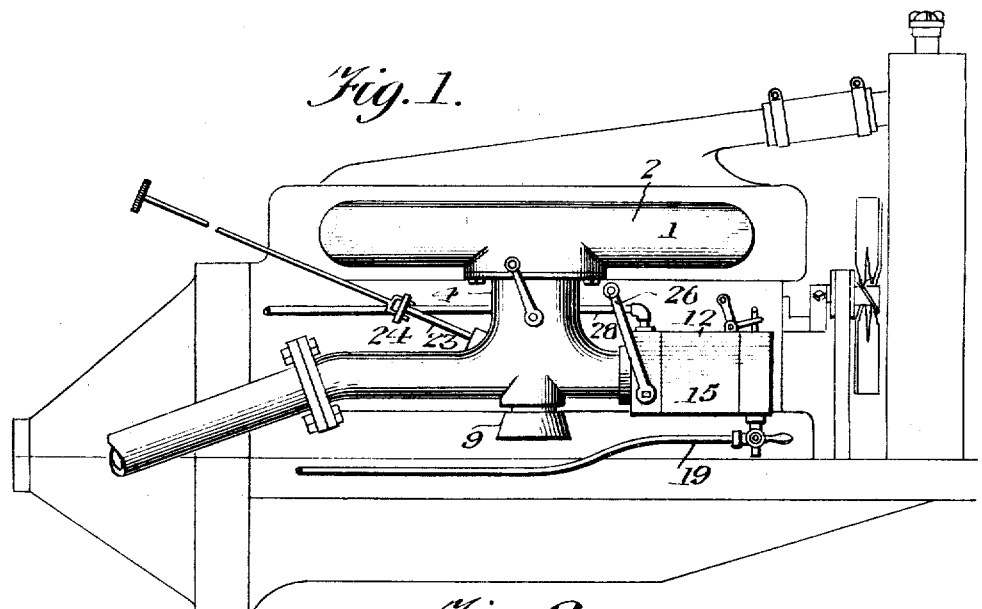
Figure 1 is a view in side elevation of an engine with the improved vaporizer in applied position.
Figure 2:
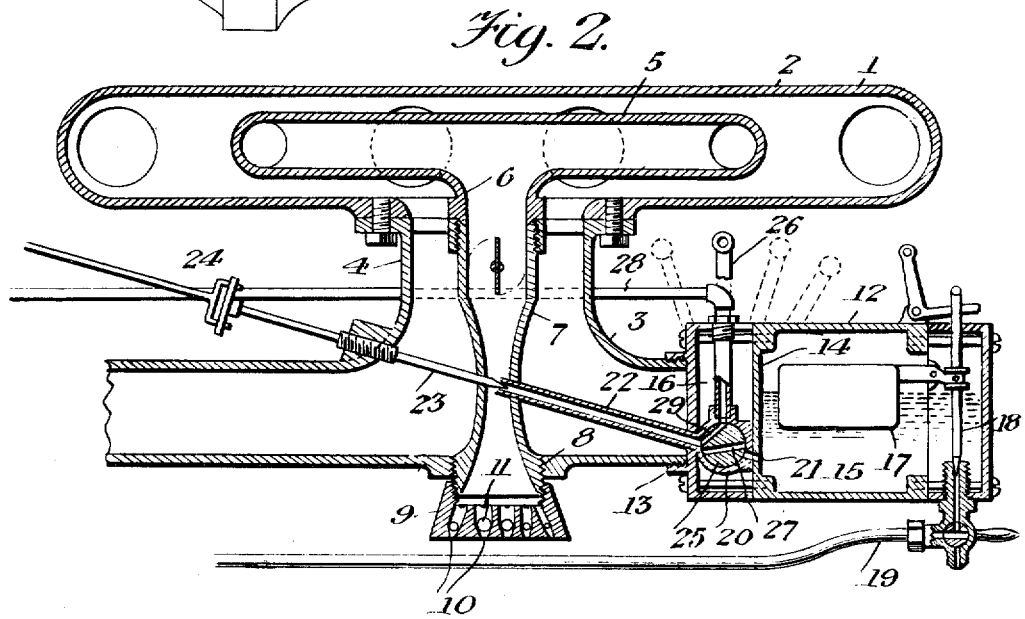
Fig. 2 is an enlarged vertical section through the vaporizing means.

The present means contemplates the delivery of the fuel from the fuel chamber or the like, to a conduit of appreciable length, hereinafter termed the vaporizing tube, and the delivery of the fuel from one end of this tube directly to the Venturi tube, with the said vaporizing tube and Venturi tube subjected at all times to the heat of the exhaust gases, the air being admitted for mixing purposes only following the exit of the vapor from the vaporizing tube.

The preferred form of means for securing the result and carrying out the method is illustrated in the accompanying drawings, being there shown as including an exhaust manifold 1, preferably made up in two sections, 2 and 3, the section 2 being in open communication with the exhaust ports of the engine, while the section 3 leads to the muffler. The section 3 has an integral offset portion 4, adapted to be removably connected to the section 2, whereby the sections 2 and 3 are in open communication.

The intake manifold 5 is arranged wholly within the exhaust manifold, being spaced entirely from the walls of the exhaust manifold, except in the connections between the inlet manifold and the intake ports of the engine, which connections pass through one wall of the exhaust manifold.

The inlet manifold 5 has a depending offset 6, to which is removably connected the Venturi tube 7. The Venturi tube extends transverse the section 3 of the exhaust manifold, and through an opening 8 in one wall of the section. The end of the Venturi tube thus opens to the atmosphere, and may, if desired, be provided with an automatically controlled air inlet, here shown as a conical member 9, having a series of air passages 10 opening therethrough, the passages being of different sizes and normally closed by balls 11, each of a size appropriate for the particular passage. As the balls differ in weight, the particular passage or passages will be opened in accordance with the suction of the engine, thus automatically controlling the air. Any desired means, such as a screen baffle 10' may be used to retain the balls in the passages 10.

The fuel chamber comprises a receptacle 12, having projected from one end thereof an annular interiorly threaded collar 13, adapted to be threaded onto the open end of the section 3 of the exhaust manifold, remote from the muffler end of such section. The receptacle thus acts to close this end of the exhaust manifold, and such chamber or receptacle is divided by a vertical partition 14, into a fuel chamber 15 and what may be termed a valve chamber 16. Arranged within the fuel chamber is a float 17, of any usual or preferred type, mounted and connected to control a needle valve 18, which governs the liquid fuel supply through the supply pipe 19, all of which parts are or may be of any usual or preferred construction.

Arranged within the valve chamber 16 is a valve casing 20, having a port 21 leading from the fuel chamber 15, and an elongated conduit or vaporizing tube 22, which extends to and through one wall of the Venturi tube 7, opening within said tube. The vaporizing tube is preferably in line with the port 21, and inclines upwardly from the valve casing to the Venturi tube, the exit end of said conduit being governed by a needle valve 23, preferably controlled and adjusted from the dash of the vehicle through any appropriate means, as indicated at 24. Arranged within the valve casing 20 is a valve 25, operated through a lever 26, which may and preferably does have a control connection leading to and through the dash of the vehicle. The valve is formed with a passage 27, which in a predetermined position of the valve establishes communication between the port 21 and the vaporizing tube 22, to thereby admit the fuel to said tube.

The use of auxiliary fuel is contemplated, as such is readily capable of use through the means here described. Provision is made for such auxiliary fuel by leading an auxiliary fuel supply pipe 28, from any source into the valve casing 20, and forming in the valve 25 an additional port or passage 29, to establish communication between said auxiliary fuel supply pipe and the vaporizing tube. The inlet ends of the respective passages 27 and 29 are preferably so disposed that in one position of the valve, said inlet ends will partly register with the port 21 and with the auxiliary fuel supply pipe, the outlet ends, in this position of the valve, both partly registering with the vaporizing tube 22. Therefore the valve may be adjusted, through manipulation of the lever 26, to deliver either fuel alone to the vaporizing tube, a mixture of both, or cut off delivery of both. This provides for four distinct positions of the valve 25, and the operating means, if desired may be suitably marked to indicate these positions.

It will be noted that the vaporizing tube inclines upwardly, terminating slightly above the float-controlled height of the fuel in the chamber 15, so that when the engine is at rest the vaporizing tube is practically filled with fuel, when the valve is open, to form an initial priming or starting charge. Furthermore the valve chamber 16, which may or may not be open to the atmosphere, acts as an air-insulating space, to prevent the heat from the exhaust manifold from unduly heating the fuel in the chamber 15, though it is obvious that the conductivity of the metals will maintain the fuel in the chamber 15 at a sufficient heat degree, to render its conversion into a thermal vapor in the vaporizing tube, more readily effected, than if said fuel was at normal temperature.

It is to be particularly noted that the vaporizing tube 22 is of appreciable length, and that the raw fuel, without the mixture of air, is subjected during its passage lengthwise this tube, to the full heat of the exhaust gases, so that the fuel is delivered into the Venturi tube as a thermal vapor, and is at this point, and for the first time, mingled with air to form the proper mixture. The heated condition of the mixture is maintained, as the Venturi tube and intake manifold are at all times surrounded by and subjected to the direct action of the heat of the exhaust gases.

I claim:

1. A gas generator for internal combustion engines, comprising an elongate casing adapted to be secured along the side of an engine, a chamber depending from and in open communication with the casing, said chamber being extended laterally, a Venturi tube arranged in said chamber and opening to the atmosphere beyond the same, and a fuel duct inclining upwardly from a source of fuel supply and opening into the Venturi tube, said fuel duct being arranged within the lateral extension of the chamber.

2. A gas generator for internal combustion engines, comprising an elongate casing adapted to be secured along the side of an engine and open to the exhaust thereof, a chamber depending from the casing and in open communication therewith, said chamber having a lateral extension, a Venturi tube arranged in said chamber and opening to the atmosphere beyond the same, a fuel receptacle carried by the lateral extension of the chamber, and a fuel duct of comparatively minute bore arranged in the lateral extension of the chamber and connecting the fuel receptacle and Venturi tube.

3. A gas generator for internal combustion engines, comprising a chamber open to the exhaust gases, an intake manifold arranged in a portion of such chamber, a Venturi tube arranged in another portion of such chamber and communicating with the atmosphere beyond the chamber, a float chamber carried by said first mentioned chamber, and a fuel duct extending through a portion of said first mentioned chamber and extending upwardly from the float chamber to and opening within the Venturi tube.

4. A gas generator for internal combustion engines, comprising an exhaust gas chamber, an intake manifold arranged in a portion of such chamber, a Venturi tube arranged in another portion of such exhaust chamber and opening to the atmosphere beyond such chamber, a float chamber carried by said exhaust chamber, and a fuel duct inclining upwardly from the float chamber and opening within the Venturi tube, said fuel duct being arranged for substantially its full length in a portion of such exhaust gas chamber, and opening within the Venturi tube at approximately the normal level of the fuel in the float chamber.

5. A gas generator for internal combustion engines, comprising an exhaust gas chamber, an intake manifold arranged in a portion of such chamber, a Venturi tube arranged in another portion of such chamber, a float chamber carried by another portion of such exhaust gas chamber, an upwardly inclined fuel duct arranged in another portion of such exhaust gas chamber and establishing communication between the float chamber and the Venturi tube, and a valve controlling fuel admission to such fuel duct.

In testimony whereof, I have affixed my signature.

JAMES M. MILLER.